United States Patent Office 3,356,339
Patented Dec. 5, 1967

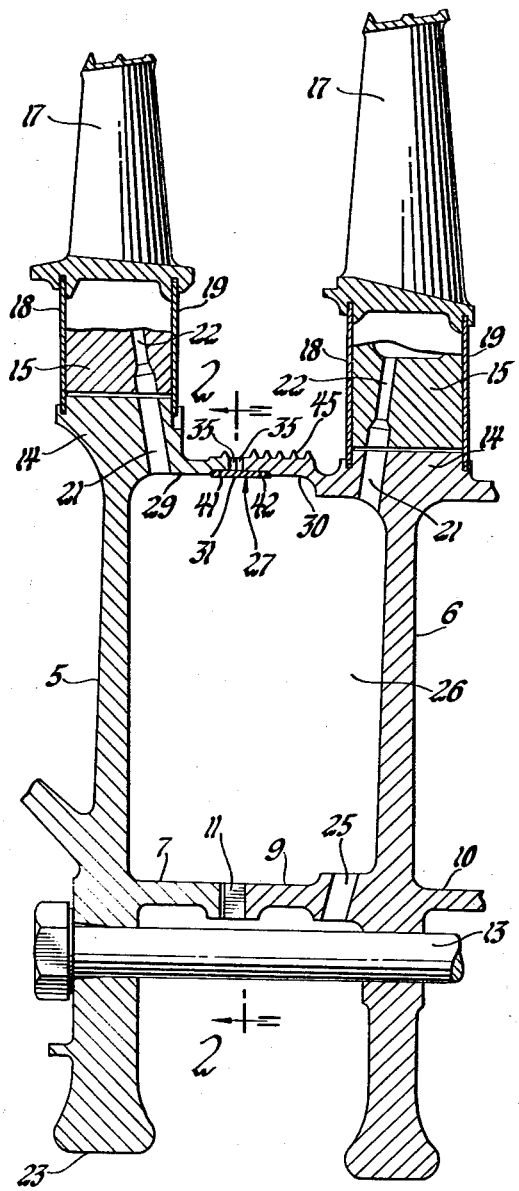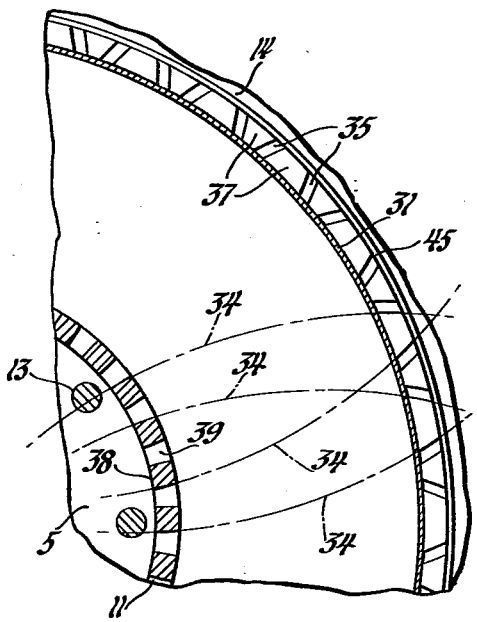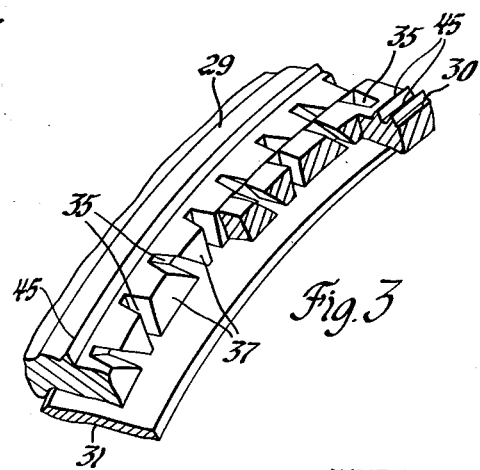

3,356,339
TURBINE ROTOR
William H. Thomas, Derby, England, and John E. Harper, Greenwood, Ind., assignors to General Motors Corporation, Detroit, Mich., a corporation of Delaware
Filed Dec. 12, 1966, Ser. No. 601,163
6 Claims. (Cl. 253—39)

ABSTRACT OF THE DISCLOSURE

A multistage turbine rotor in which the bladed wheels are coupled by Curvic face splines. Opposed flanges near the wheel rims meet at the pitch plane of the splines and are notched marginally by the spline cutter. A flexible ring extending around the inside of the margins of the flanges contains blade cooling air within the space between the wheels.

Specification

Our invention relates to improvements in turbomachine rotors and particularly to improved arrangements for coupling the disks or wheels or multistage turbine rotors in association with means providing a seal between the wheels adjacent the rim.

By way of background, it has been common practice to construct multistage rotors of devices such as axial-flow compressors and turbines of a number of coaxial disks and to connect these disks together by face splines and tie bolts. The face splines preferably are of a type known as Curvic couplings which accurately and positively align the several disks. Ordinarily, the Curvic coupling is of considerably smaller radius than the wheels. However, it may be desirable to provide interstage spacers for sealing purposes between the turbine wheels near the rim of the wheels radially outward from the Curvic coupling. Such a spacer may be, and often is, provided by a separate ring or disk mounted between turbine wheels. In addition, where the turbine embodies means for cooling the wheel rims and blades, means to minimize leakage from the rotor between the wheels or between the wheels and sealing rings may be needed. Examples of the sort of structure to which reference is made may be found in U.S. Patents No. 3,034,298 and No. 3,245,657, also in the U.S. patent application of Beuford C. Hall, Jr., Ser. No. 438,476, filed Mar. 10, 1965, for Multi-Stage Turbine Rotor (Patent No. 3,295,825, issued Jan. 3, 1967).

In some turbine structures the sealing rings may be provided by flanges integral with and extending from the turbine wheels. However, it has not been considered possible to use this simple integral construction in combination with the highly desirable Curvic connection between the wheels because of interference between the flange and the cup-shaped grinding wheel which forms the teeth of the coupling. Our invention, in its preferred embodiment, involves the concept that flanges may extend from the wheels radially outward of the coupling, these flanges abutting or closely approaching each other at or near the pitch plane of the Curvic coupling. In such a structure, the generation of the Curvic coupling involves cutting notches across the margins of the outer flanges. However, these notches may be blocked off by a simple annular seal ring which bridges the notches and inhibits leakage through the seal ring.

The nature of our invention and its advantages will be clear to those skilled in the art from the succeeding detailed description and the accompanying drawings of the preferred embodiment thereof.

FIGURE 1 is a sectional view of two stages of the rotor of a gas turbine taken on a plane containing the axis of the rotor; FIGURE 2 is a partial sectional view taken on the plane indicated by the line 2—2 in FIGURE 1; and FIGURE 3 is a fragmentary axonometric view.

Referring first to FIGURE 1 for the general arrangement, the turbine rotor may comprise a first stage wheel 5, a second stage wheel 6, and additional wheels (not illustrated). Wheel 5 has a rearwardly extending inner or coupling flange 7 and wheel 6 bears a similar forwardly extending flange 9 and rearwardly extending flange 10. A face spline 11, preferably of the well-known Curvic type, connects the inner flanges 7 and 9. The rotor wheels are held assembled by a ring of tie bolts 13. Each wheel includes a rim 14 on which are mounted the roots 15 of turbine blades 17. Sealing rings 18 and 19 may be provided between the wheel rim and the platforms of blades 17. Radial passages 21 in the rims and 22 in the blade roots conduct cooling air to the interior of the blades from which it is discharged through any suitable structure. This cooling air may be supplied through the central opening 23 of wheel 5 and holes 25 in flange 9 to the cavity 26 between the two wheels, from which it flows through the passages 21 and 22.

In order to contain the air within the rotor and for other purposes, an interstage spacer 27 is defined by a flange 29 extending rearwardly from rim 14, a flange 30 extending forwardly from rim 14, and a seal ring 31. The flanges 29 and 30 are of such length as to meet in the same plane as the pitch plane (mean plane) of the coupling 11 or near thereto. Therefore, when the teeth of the coupling 11 are machined by a face cutter rotating about an axis parallel to the axis of the wheels, the cutter traverses arcs much as indicated by the lines 34 in FIGURE 2 and produces notches 35 in the flange 29 or 30. The edge of the rim, therefore, has projections or pins 37 extending between the notches cut by the grinder.

The machining of such Curvic splines is well known and need not be described in detail. The teeth 38 on one member are convex and the teeth 39 on the other member are concave. The teeth taper axially of the rotor so that when the wheels are drawn together the tapering teeth fit closely and rigidly lock the wheels together. A description may be found in the brochure "Curvic Coupling Design," copyright 1964, by The Gleason Works, Rochester, N.Y.

The projections 37 at the rim engage and thus serve to stiffen the rotor or, if desired, there may be some space between the two flanges 29 and 30. However, whether or not there is a space between them, the substantial gas leakage path through the slots 35 must be closed, and for this purpose a lightweight flat metal sealing ring 31 is provided. As shown most clearly in FIGURE 3, ring 31 is an endless strip of sheet stock, the ends being welded together to form a continuous flexible ring and the edges being chamfered. This ring fits within a machined pilot 41 on flange 29 and similar pilot 42 on flange 30. The ring may be a slip-fit within the flanges and may be expanded slightly by centrifugal force when the engine is operating so as to bear tightly against the flanges. The pins 37 provide sufficient support for the ring and serve the useful function of lightening the margins of the flanges and thereby reducing the centrifugal loads on the flanges and on the disks 5 and 6. Thus, while the notches are a natural by-product of the presence of the flange which defines its portion of the interstate spacer and of the useful method of machining the Curvic coupling splines, the presence of the notches or of the spaced pins is beneficial in lightening the rotor.

Labyrinth seal ridges 45 may be provided on the outer surface of flanges 29 and 30 to cooperate with a seal ring on the nozzle diaphragm (not illustrated) located between the disks 5 and 6.

It should be pointed out that it is in many cases highly desirable for flanges 29 and 30 to be in abutting relationship. In this case, the flanges are effective to damp out vibrations in the wheels. For example, this serves to prevent the occurrence of standing wave vibrations in the wheels.

The detailed disclosure of the preferred embodiment of the invention is not to be considered as limiting, since many modifications may be made by the exercise of skill in the art within the scope of the invention.

We claim:

1. A turbomachine rotor comprising, in combination, two disks having a common axis, a coupling flange on each disk, the coupling flanges having mating face spline teeth extending across a pitch plane normal to the said axis, an outer flange on each disk of greater diameter than the coupling flanges, the outer flanges being in mutually confronting non-overlapping relationship adjacent to the said pitch plane, the outer flanges having notches in the mating edges thereof with support pins extending axially between the notches and a sealing ring mounted on the outer flanges covering the said notches and backed up by the support pins.

2. A rotor as recited in claim 1 in which the notches are of a configuration determined by a tool which cuts the spline teeth and concurrently cuts the notches.

3. A rotor as recited in claim 2 in which the spline teeth define a Curvic coupling.

4. A rotor as recited in claim 1 in which the spline teeth define a Curvic coupling.

5. A rotor as recited in claim 1 in which the sealing ring is fitted inside the outer flanges.

6. A rotor as recited in claim 1 in which the pins on the disks are in abutting relation to provide mutual frictional vibration damping between the disks.

References Cited

UNITED STATES PATENTS

| 2,452,782 | 11/1948 | McLeod et al. | 253—39 |
| 2,672,279 | 3/1954 | Willgoos | 253—39 X |
| 3,295,825 | 1/1967 | Hall | 253—39 |

EVERETTE A. POWELL, JR., *Primary Examiner.*